(12) United States Patent
Redon et al.

(10) Patent No.: US 6,381,107 B1
(45) Date of Patent: Apr. 30, 2002

(54) MAGNETO-RESISTIVE TUNNEL JUNCTION HEAD HAVING A SHIELD LEAD REAR FLUX GUIDE

(75) Inventors: Olivier Redon; Koji Shimazawa; Noriaki Kasahara; Satoru Araki, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/517,570

(22) Filed: Mar. 2, 2000

(30) Foreign Application Priority Data

Jun. 24, 1999 (JP) .............................. 11-177977

(51) Int. Cl.⁷ .............................. G11B 5/39; G11B 5/10
(52) U.S. Cl. ................... 360/324.2; 360/319; 360/321; 360/324.12
(58) Field of Search .................. 360/324.2, 319, 360/321, 324.12, 324.11, 324.1

(56) References Cited

U.S. PATENT DOCUMENTS

| | | | |
|---|---|---|---|
| 5,366,815 A | | 11/1994 | Araki et al. |
| 5,510,172 A | | 4/1996 | Araki et al. |
| 5,514,452 A | | 5/1996 | Araki et al. |
| 5,583,726 A | * | 12/1996 | Mizoshita et al. |
| 5,657,190 A | | 8/1997 | Araki et al. |
| 5,661,449 A | | 8/1997 | Araki et al. |
| 5,696,656 A | * | 12/1997 | Gill et al. |
| 5,729,410 A | | 3/1998 | Fontana, Jr. et al. |
| 5,736,236 A | | 4/1998 | Araki et al. |
| 5,783,284 A | | 7/1998 | Shinjo et al. |
| 5,789,069 A | | 8/1998 | Araki et al. |
| 5,798,896 A | | 8/1998 | Araki et al. |
| 5,862,022 A | | 1/1999 | Noguchi et al. |
| 5,874,886 A | | 2/1999 | Araki et al. |
| 5,923,504 A | | 7/1999 | Araki et al. |
| 5,936,293 A | * | 8/1999 | Parkin |
| 5,958,611 A | | 9/1999 | Ohta et al. |
| 5,966,275 A | * | 10/1999 | Iijima |
| 5,968,676 A | | 10/1999 | Araki et al. |
| 6,004,654 A | | 12/1999 | Shinjo et al. |
| 6,198,608 B1 | * | 3/2001 | Hong et al. ............. 360/324.12 |
| 6,219,212 B1 | * | 4/2001 | Gill et al. ................ 360/324.2 |
| 6,223,420 B1 | * | 5/2001 | Lee et al. .................... 360/321 |

* cited by examiner

Primary Examiner—Craig A. Renner
(74) Attorney, Agent, or Firm—Oblon, Spivak, McClelland, Maier & Neustadt, P.C.

(57) ABSTRACT

In the present invention, a common lead and shield layer is used so as to be electrically contacted with a tunnel multilayered film for supplying a sense current to the tunnel multilayered film. The common lead and shield layer extends to a rear portion of the tunnel multilayered film from an ABS (Air Bearing Surface) so that a part of the common lead and shield layer located at the rear portion of the tunnel multilayered film serves as a back flux guide for improving a read output. Therefore, a lead gap can be remarkably reduced to easily achieve the high-density recording. Further, a large and stable head output suitable for the ultra-high density recording can be obtained with an improved biasing efficiency.

18 Claims, 10 Drawing Sheets

MAGNETO-RESISTIVE TUNNEL JUNCTION HEAD HAVING A SHIELD LEAD REAR FLUX GUIDE

BACKGROUND OF THE INVENTION

1. Field of the Invention

The present invention relates to a magneto-resistive tunnel junction head for reading the magnetic field intensity from a magnetic recording medium or the like as a signal and, in particular, to a magneto-resistive tunnel junction head having common leads and shields and suitable for ultra-high density magnetic recording.

2. Description of the Prior Art

MR sensors based on the anisotropic magneto-resistance (AMR) or spin-valve (SV) effect are widely known and extensively used as read transducers in magnetic recording. MR sensors can probe the magnetic stray field coming out from transitions recorded on a recording medium by the resistance changes of a reading portion formed of magnetic materials. AMR sensors have quite a low resistance change ratio $\Delta R/R$, typically from 1 to 3%, whereas the SV sensors have a $\Delta R/R$ ranging from 2 to 7% for the same magnetic field excursion. The SV magnetic read heads showing such high sensitivity are progressively supplanting the AMR read heads to achieve very high recording density, namely over several Giga bits per square inch (Gbits/in$^2$).

Recently, a new MR sensor has attracted attention for its application potential in ultra-high density recording. Magneto-resistive tunnel junctions (MRTJ, or synonymously referred to as TMR) are reported to have shown a resistance change ratio $\Delta R/R$ over 12%. Although it has been expected that TMR sensors replace SV sensors in the near future as the demand for ultra-high density is ever growing, an application to the field of the magnetic heads has just started, and one of the outstanding objects is to develop a new head structure, which can maximize the TMR properties. Great efforts of developments are still needed to design a new head structure since TMR sensors operate in CPP (Current Perpendicular to the Plane) geometry, which means that TMR sensors requires the current to flow in a thickness direction of a laminate film.

In a basic SV sensor which has been developed for practical applications, two ferromagnetic layers are separated by a non-magnetic layer, as described in U.S. Pat. No. 5,159,513. An exchange layer (FeMn) is further provided so as to be adjacent to one of the ferromagnetic layers. The exchange layer and the adjacent ferromagnetic layer are exchange-coupled so that the magnetization of the ferromagnetic layer is strongly pinned (fixed) in one direction. The other ferromagnetic layer has its magnetization which is free to rotate in response to a small external magnetic field. When the magnetization's of the ferromagnetic layers are changed from a parallel to an antiparallel configuration, the sensor resistance increases and a $\Delta R/R$ in the range of 2 to 7% is observed.

In comparison between the SV sensor and the TMR sensor, the structure of the TMR is similar to the SV sensor except that the non-magnetic layer separating the two ferromagnetic layers is replaced by a tunnel barrier layer being an insulating layer and that the sense current flows perpendicular to the surfaces of the ferromagnetic layers. In the TMR sensor, the sense current flowing through the tunnel barrier layer is strongly dependent upon a spin-polarization state of the two ferromagnetic layers. When the magnetization's of the two ferromagnetic layers are antiparallel to each other, the probability of the tunnel current is lowered, so that a high junction resistance is obtained. On the contrary, when the magnetization's of the two ferromagnetic layers are parallel to each other, the probability of the tunnel current is heightened and thus a low junction resistance is obtained.

U.S. Pat. No. 5,729,410 discloses an example wherein a TMR sensor (element) is applied to a magnetic head structure. The TMR sensor is sandwiched between two parallel electrical leads (electrodes), that are in turn sandwiched between first and second insulating gap layers of alumina or the like to form a read gap. A pair of magnetic shield layers are further formed to sandwich therebetween the first and second insulating gap layers.

However, as described above, the conventional TMR head has a structure wherein the pair of electrode layers, the pair of gap layers and the pair of shield layers are stacked in turn to sandwich the TMR multilayered film. As a result, the read gap is enlarged at a head end surface, i.e. an ABS (Air Bearing Surface) of the head, confronting against a magnetic recording medium. Thus, such kind of TMR head design is handicapped for application to high-density recording. Moreover, the biasing efficiency of this structure is quite poor due to the separation between the free layer and the permanent magnets. If the permanent magnets are formed in an overlapping manner on the TMR film, a strong decrease of the TMR ratio is yet expected due to a large difference of the junction resistance in the regions below and in between the permanent magnets.

The present invention has been made under these circumstances and has an object to provide a magneto-resistive tunnel junction (TMR) head which has an improved new electrode structure so as to be readily adaptable to high-density recording.

Another object of the present invention is to provide a magneto-resistive tunnel junction head with high biasing efficiency and no reduction in TMR ratio to ensure a high and stable head output for adaptation to ultra high-density recording.

SUMMARY OF THE INVENTION

For solving the foregoing problems, according to one aspect of the present invention, there is provided a magneto-resistive tunnel junction head comprising a tunnel multilayered film having a tunnel barrier layer, a ferromagnetic free layer and a ferromagnetic pinned layer such that the tunnel barrier layer is held between the ferromagnetic free layer and the ferromagnetic pinned layer; and a common lead and shield layer electrically contacted with at least one of opposite sides in a laminate direction of the tunnel multilayered film, the common lead and shield layer serving both as an electrode for allowing a sense current to flow through the tunnel multilayered film and as a magnetic shield layer, wherein the common lead and shield layer extends to a rear portion of the tunnel multilayered film from an air bearing surface (ABS) so that a part of the common lead and shield layer located at the rear portion of the tunnel multilayered film serves as a back flux guide for improving a read output.

It is preferable that the common lead and shield layers are electrically contacted with the opposite sides of the tunnel multilayered film in the laminate direction thereof such that one of the common lead and shield layers extends to the rear portion of the tunnel multilayered film from the air bearing surface (ABS) so that the part of the one of the common lead and shield layers located at the rear portion of the tunnel multilayered film serves as the back flux guide for improving the read output.

It is preferable that an electrically conductive, non-magnetic gap layer is provided between the common lead and shield layer and the tunnel multilayered film.

It is preferable that the common lead and shield layer is made of a material selected from NiFe, Sendust, CoFe and CoFeNi.

It is preferable that the gap layer comprises a layer made of a material selected from Cu, Al, Ta, Au, Cr, In, Ir, Mg, Rh, Ru, W, Zn or an alloy thereof.

It is preferable that the gap layer has a thickness of 50 to 700 Å.

It is preferable that the gap layer is made of a highly anticorrosive material and selected from Ta, Rh and Cr.

It is preferable that the ferromagnetic free layer of the tunnel multilayered film is connected, at longitudinally opposite ends thereof, with biasing means so that a biasing magnetic field is applied to the ferromagnetic free layer in a longitudinal direction thereof, and that the ferromagnetic free layer has a length in the longitudinal direction which is set greater than a longitudinal length of the ferromagnetic pinned layer such that the ferromagnetic free layer has at the opposite ends thereof extended portions each extending beyond corresponding one of longitudinal opposite ends of the ferromagnetic pinned layer.

It is preferable that biasing means located at longitudinal opposite ends of the ferromagnetic free layer are magnetically contacted with upper or lower portions of extended portions at the opposite ends of the ferromagnetic free layer, and that each of the biasing means is located with a predetermined space (D) from corresponding one of longitudinal opposite ends of the ferromagnetic pinned layer.

It is preferable that the space (D) is set to no less than 0.02 $\mu$m.

It is preferable that the space (D) is set to no less than 0.02 $\mu$m and no greater than 0.3 $\mu$m.

It is preferable that the space (D) is set to no less than 0.02 $\mu$m and less than 0.15 $\mu$m.

It is preferable that the ferromagnetic free layer has a thickness of 20 to 500 Å.

It is preferable that the tunnel multilayered film has a multilayered film detection end surface constituting the air bearing surface (ABS).

It is preferable that the ferromagnetic free layer is a synthetic ferrimagnet.

It is preferable that the ferromagnetic pinned layer is in the form of a pair of ferromagnetic layers antiferromagnetically coupled via a non-magnetic layer.

It is preferable that each of the biasing means is made of a highly coercive material or an antiferromagnetic material, or in the form of a laminate body having an antiferromagnetic layer and at least one ferromagnetic layer.

It is preferable that a pinning layer for pinning magnetization of the ferromagnetic pinned layer is stacked on a surface of the ferromagnetic pinned layer remote from a side thereof abutting the tunnel barrier layer.

It is preferable that longitudinal opposite ends of the tunnel multilayered film are insulated by insulating layers.

DETAILED DESCRIPTION OF THE INVENTION

Hereinbelow, the present invention will be described in terms of preferred embodiments with reference to the accompanying drawings.

Figure 1:
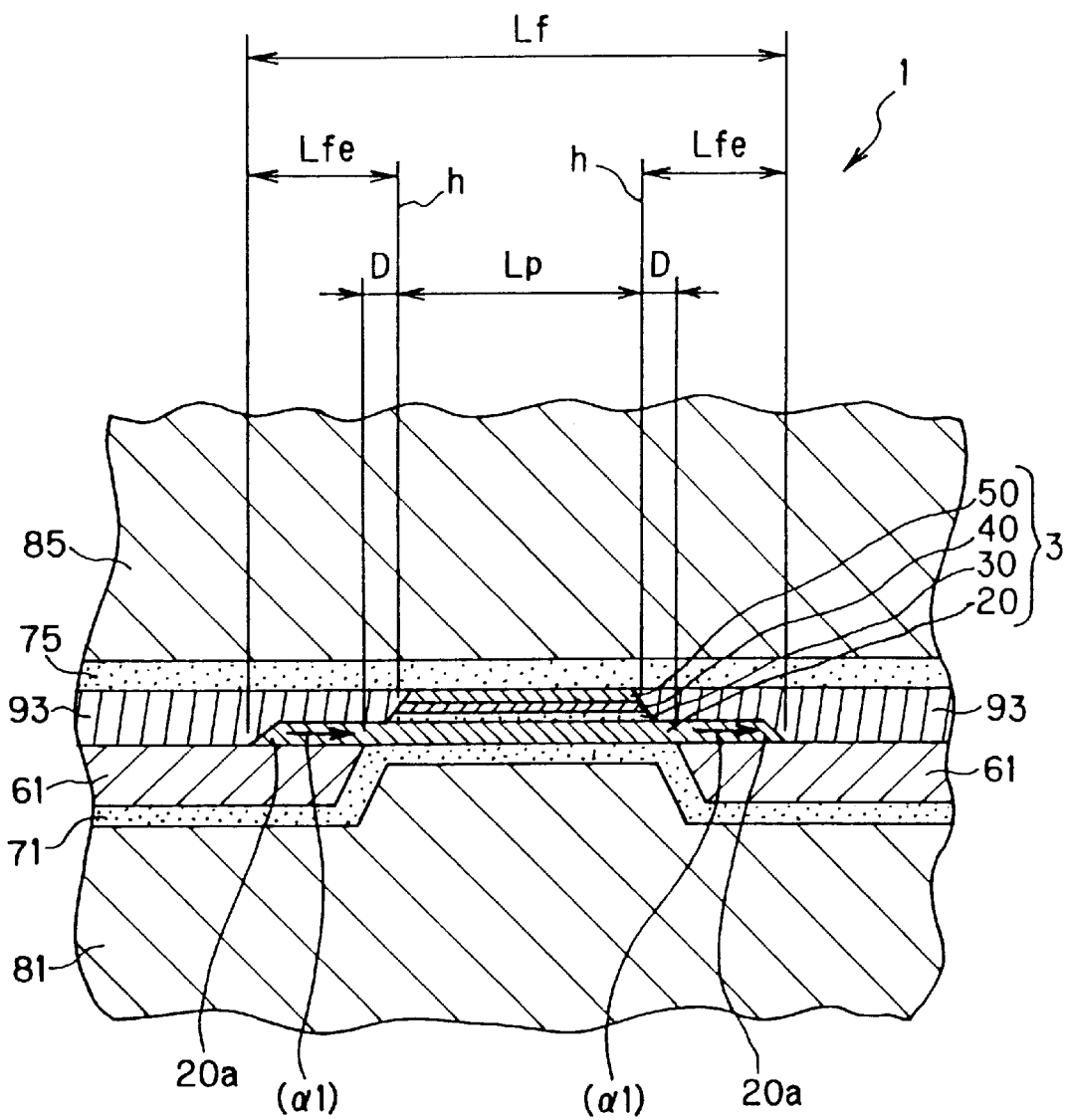
FIG. 1 is a sectional view showing a magneto-resistive tunnel junction head according to a preferred embodiment of the present invention.

FIG. 1 is a sectional view showing a magneto-resistive tunnel junction head (hereinafter simply referred to as "TMR head") 1 according to a preferred embodiment of the present invention. This sectional view corresponds to a surface that is located in a confronting relationship to a magnetic recording medium which produces an external magnetic field as magnetic information. This surface is generally called an ABS (Air Bearing Surface).

In this embodiment, the TMR head 1 has a tunnel multilayered film 3 which exhibits a magneto-resistive spin tunnel effect (spin tunneling magneto-resistive effect). Specifically, the tunnel multilayered film 3 has a laminate structure composed of a tunnel barrier layer 30, a ferromagnetic free layer 20 formed on one surface of the tunnel barrier layer 30, and a ferromagnetic pinned layer 40 formed on the other surface of the tunnel barrier layer 30 so that the tunnel barrier layer 30 is held between the layers 20 and 40. The ferromagnetic free layer 20 can basically change its magnetization direction freely in response to an external magnetic field as magnetic information. On the other hand, the ferromagnetic pinned layer 40 is pinned such that its magnetization direction is entirely fixed in one direction (in FIG. 1, the pinned magnetization direction is in a depth direction of the drawing sheet). Thus, as shown in FIG. 1, a pinning layer 50 for pinning the magnetization of the ferromagnetic pinned layer 40 is stacked on a surface of the ferromagnetic pinned layer 40 remote from a surface thereof abutting the tunnel barrier layer 30.

The tunnel multilayered film 3 is preferably formed such that its multilayered film detection end surface constitutes an ABS (Air Bearing Surface). Specifically, it is preferable that respective detection end surfaces of the ferromagnetic free layer 20, the tunnel barrier layer 30 and the ferromagnetic pinned layer 40 are exposed to constitute the same head end surface. This structure allows reduction of loss in tunnel effects as compared with a structure in which, for example, the end surface of only the ferromagnetic free layer 20 is exposed at the end surface of the head, thus resulting in greater TMR ratio.

In the embodiment shown in FIG. 1, on both sides of the tunnel multilayered film 3 in a laminate direction thereof, at least two common lead and shield layers 81 and 85 are electrically contacted to serve both as electrodes for allowing a sense current to flow through the tunnel multilayered film 3 and as magnetic shield layers. By using the common lead and shield layers 81 and 85, a read gap can be largely reduced and nonuniform current flows in the tunnel multilayered film 3 can be prevented. The nonuniform current distribution in the tunnel multilayered film 3 unfavorably reduces an effective junction area thereby to result in reduction of output.

In the conventional head structure, if an electrode is made extremely thin for reducing a read gap as much as possible, the resistance becomes quite high at the electrode portion. If the electrode resistance becomes of the same order than the resistance of the TMR element, the nonuniform current flows are inevitably generated in the tunnel multilayered film.

Each of the common lead and shield layers 81 and 85 in the present invention is made of NiFe (permalloy), Sendust, CoFe or CoFeNi. Each of the common lead and shield layers 81 and 85 is preferably made of a single layer as shown in FIG. 1. On the other hand, it may be in the form of a laminate body made of a plurality of materials selected from the foregoing materials. A sense current is supplied to the common lead and shield layers 81 and 85 so that the sense current flows through the tunnel multilayered film 3 in its laminate direction, which is electrically contacted with the common lead and shield layers 81 and 85. Each of the common lead and shield layers 81 and 85 has a thickness of 0.5 μm to 4.0 μm, preferably 1 μm to 3 μm. If it exceeds 4 μm, an increase of production cost is resulted. Further, there is raised inconvenience that the magnetic stability of the shield is reduced. On the other hand, if the thickness is less than 0.5 μm, it no longer functions as a magnetic shield.

The common lead and shield layer 85 may be formed so as to be directly contacted with the tunnel multilayered film 3. Alternatively, the common lead and shield layers 81 and 85 may be electrically contacted with the tunnel multilayered film 3 through non-magnetic and conductive gap layers 71 and 75, respectively, as illustrated in FIG. 1. In the former case of the direct contact with the tunnel multilayered film 3 with no top gap layer 75, the distance between the shields can be reduced to the minimum level, thus extensively contributing to the high-density recording. In contrast, in the latter case shown in FIG. 1 of the indirect contact with the tunnel multilayered film 3 with provision of the gap layer, there is an advantage that the exchange coupling from the pinning layer 50 on the pinned layer 40 is larger.

Each of the gap layers 71 and 75 has a layer made of a material selected from Cu, Al, Au, Ta, Rh, Cr, In, Ir, Mg, Ru, W, Zn or an alloy of these materials. The gap layers 71 and 75 have functions of adjusting a distance between the shields, adjusting the position of the TMR multilayered film and preventing the ununiform tunnel current. Each of the gap layers 71 and 75 is preferably formed of a single layer as illustrated in FIG. 1 but, if desired, may be formed of a laminate body of the materials selected from the foregoing materials. Each of the gap layers 71 and 75 has a thickness of 50 to 700 Å, preferably 100 to 500 Å, and more preferably 100 to 300 Å. If the thickness exceeds 700 Å, the distance between the shields becomes longer than required, resulting in shortage of the so-called BPI so that it is not suited for the high density recording. On the other hand, if the thickness is less than 50 Å, the flux density into the free layer becomes too small, resulting in a poor output signal.

Among the foregoing materials for the gap layers 71 and 75, it is preferable to use highly anticorrosive materials as Ta, Rh, Cr, etc. because, in a fabricating process of the head, the gap layers 71 and 75 may be subjected to chemical-mechanical planarization (CMP). Another reason for using such highly anti-corrosive materials is to prevent any unrecoverable, electrical and magnetic damages to the head characteristics during a lapping step which is implemented at the final step of the head fabricating process.

The tunnel multilayered film 3 of the present invention is preferably formed by the specification shown in FIG. 1. Specifically, the ferromagnetic free layer 20, which constitutes a part of the tunnel multilayered film 3, is formed such that a bias magnetic field (for example, in the direction of arrow α1) is applied in the longitudinal direction of the ferromagnetic free layer 20 by biasing means 61 and 61 which are stacked at longitudinally opposite ends (left and right directions of the drawing paper) of the ferromagnetic free layer 20.

A length $L_f$ in the longitudinal direction (substantially the same as the bias magnetic field applying direction) of the ferromagnetic free layer 20 is set to be greater than a longitudinal length $L_p$ of the ferromagnetic pinned layer 40. The ferromagnetic free layer 20, which is longer than the ferromagnetic pinned layer 40 as described above, has extended portions 20a extending further beyond the longitudinal ends (designated by lines h) of the ferromagnetic pinned layer 40. Each of the extended portions 20a has a length $L_{fe}$ and occupies a part of the ferromagnetic free layer 20, which means that the extended portion 20a is synonymous to a projected length extending further from the end of the ferromagnetic pinned layer 40.

The longitudinal length $L_f$ of the ferromagnetic free layer 20 is set to be in the range of 0.5 μm to 20 μm. The length $L_{fe}$ of the extended portion 20a of the ferromagnetic free layer 20, which is determined in relation to the longitudinal length $L_p$ of the ferromagnetic pinned layer 40, is set to be in the range of 0.1 μm to 5 μm.

The foregoing biasing means 61 and 61 are contacted in a laminate state with the extended portions 20a and 20a at the opposite ends of the ferromagnetic free layer 20. The biasing means 61 and 61 are in exchange-coupling to the extended portions 20a and 20a the magnetization direction is fixed in the direction shown by arrow α1. Each of the biasing means 61 and 61 is formed such that a predetermined space D is maintained from the corresponding longitudinal end of the ferromagnetic pinned layer 40, as shown in FIG. 1.

The space D is preferably determined, upon determining the head specification, in a predetermined range in order to avoid substantial lowering of TMR ratio characteristics. It is preferable that the specific value is set depending on the head specification, such as materials and dimensions of components to be used. As a preferred example, the space D is set to be no less than 0.02 μm, particularly in the range of 0.02 μm to 0.3 μm, and more preferably, in the range of 0.02 μm to less than 0.15 μm. If the value of D is less than 0.02 μm, the TMR ratio tends to be lowered. In contrast, if the value of D increases to exceed 0.3 μm, an effective track width is unfavorably expanded to result in failure to meet with the requirement of high density recording in the future. If a concentrated attention is paid to the effective track width, the D value is preferably set to be in the range of no less than 0.02 μm to less than 0.15 μm.

The thickness of the ferromagnetic free layer 20 in the present invention is set to be 20 Å to 500 Å, preferably 40

Å to 300 Å, and more preferably 60 Å to 200 Å. If the thickness is less than 20 Å, it is difficult to set the length $L_f$ of the ferromagnetic free layer 20 to be sufficiently large in view of the film formation technique. If the thickness exceeds 500 Å, dispersion of electronic polarizability is produced due to property variance within the ferromagnetic free layer, resulting in reduction of the TMR ratio.

With respect to the entire structure of the TMR head and more particularly to components thereof that have not been explained yet, insulating layers 93 and 93 of alumina, for example, are externally formed on the opposite ends of the TMR multilayered film, so that the biasing means 61 and 61 are fully insulated from the tunnel barrier layer 30 and from the gap layer 75 to prevent direct electrical path that would completely short the TMR multilayered film 3.

Each of the ferromagnetic free layer 20 and the ferromagnetic pinned layer 40 is made preferably of a high spin polarization material, such as Fe, Co, Ni, FeCo, NiFe, CoZrNb or FeCoNi for the purpose of obtaining the highest TMR ratio. It may be in the form of a laminate body having two or more layers. The thickness of the ferromagnetic free layer 20 is set to be 20 Å to 500 Å, preferably 40 Å to 300 Å. An excessive thickness of the layer 20 tends to result in lowering of an output at the time of head operation and, in contrast, if it is thinner than required, magnetic properties become unstable to result in increase of noise at the time of head operation. The thickness of the ferromagnetic pinned layer 40 is set to be 10 Å to 100 Å, preferably 20 Å to 50 Å. If the thickness is more than required, the pinning of magnetization by the pinning layer 50 is weakened and, on the other hand, if it is less than required, the TMR ratio tends to reduce.

The pinning layer 50 for pinning the magnetization of the ferromagnetic pinned layer 40 is normally made of an antiferromagnetic material, although not limited thereto as long as exhibiting a pinning function. The thickness of the pinning layer 50 is normally set in the range of 60 Å to 300 Å.

Figure 8A:
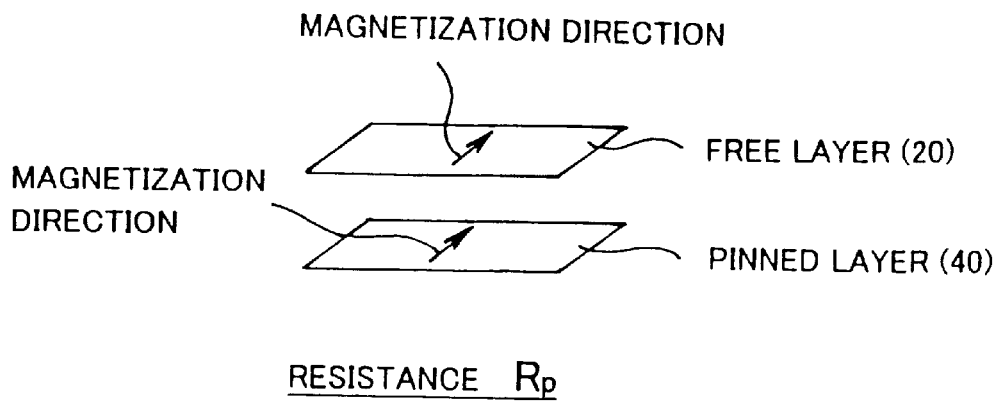
FIGS. 8A and 8B are schematic diagrams for explaining a magneto-resistive tunnel effect according to the present invention.
Figure 8B:
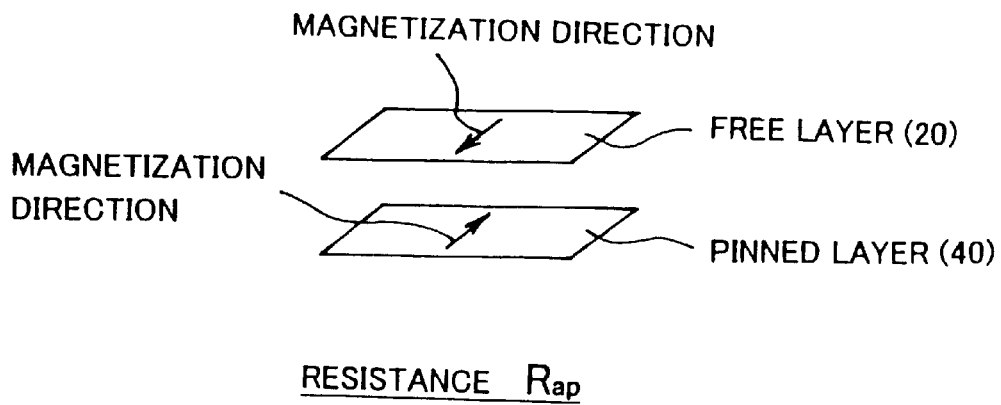

Now, the ferromagnetic magneto-resistive tunnel effect (spin tunneling magneto-resistive effect) will be briefly explained with reference to FIGS. 1, 8A and 8B. As the sense current is flowing perpendicularly to the surfaces of the TMR multilayered film 3, the conduction electrons are spin-polarized when they experience the first ferrogmagnetic layer (20 or 40 depending on the current flowing direction). The probability of tunneling through the tunnel barrier layer 30 is thus spin-dependent and depends upon the relative orientation of the two ferrogmagnetic layers 20 and 40 sandwiching the tunnel barrier layer 30. As illustrated in FIG. 8A, when the ferromagnetic layers 20 and 40 are parallel in magnetization to each other (or the relative magnetization angle therebetween is small), the density of states of a majority of spins is high in both layers, resulting in a high probability of electron tunneling through 30 and a low junction resistance Rp. In contrast, as illustrated in FIG. 8B, when the ferromagnetic layers 20 and 40 are antiparallel in magnetization to each other (or the relative angel of magnetization therebetween is large), the density of states of a majority at spins is very different in each ferromagnetic layer, resulting in a low probability of electron tunneling through 30 and a high junction resistance Rap. By utilizing the change in resistance depending on the change in relative magnetization angel, an external magnetic field is detected, for example.

The tunnel barrier layer 30 sandwiched between the two ferromagnetic layers 20 and 40 is formed of $Al_2O_3$, NiO, GdO, MgO, $Ta_2O_5$, $MoO_2$, $TiO_2$, $WO_2$ or the like. The thickness of the tunnel barrier layer 30 is desired to be as thin as possible for reducing the resistance of the element. However, if the thickness becomes too thin to cause pin holes, a leak current is generated, which is not preferable. In general, the thickness is set to about 5 Å to 20 Å.

Figure 9:
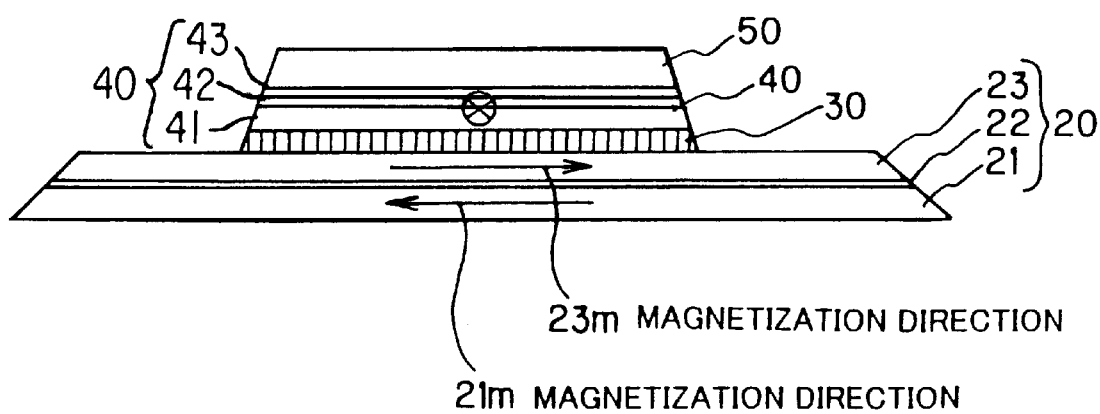
FIG. 9 is a sectional view of a tunnel multilayered film for explaining a preferred example of a ferromagnetic free layer to be used in the present invention.

As one preferred example of the present invention, the ferromagnetic free layer 20 may be in the form of a synthetic ferrimagnet of a three-layered laminate body of NiFe layer 21 (20 in thickness)/Ru layer 22 (& in thickness)/NiFe layer 23 (30 in thickness) as illustrated in FIG. 9. In this example, magnetization direction 21m and 23m of the NiFe layers 21 and 23 are opposite to each other. Using the synthetic ferrimagnet, the effective magnetic film thickness can be set thinner so that the TMR ratio can be increased to achieve an increased head output. Such a synthetic ferromagnet may also be applied to the ferromagnetic pinned layer 40. Specifically, the ferromagnetic pinned layer 40 may be composed of a pair of ferromagnetic layers 41 and 43 which are antiferromagnetically coupled via a non-magnetic layer 42 as illustrated in FIG. 9.

Figure 4:
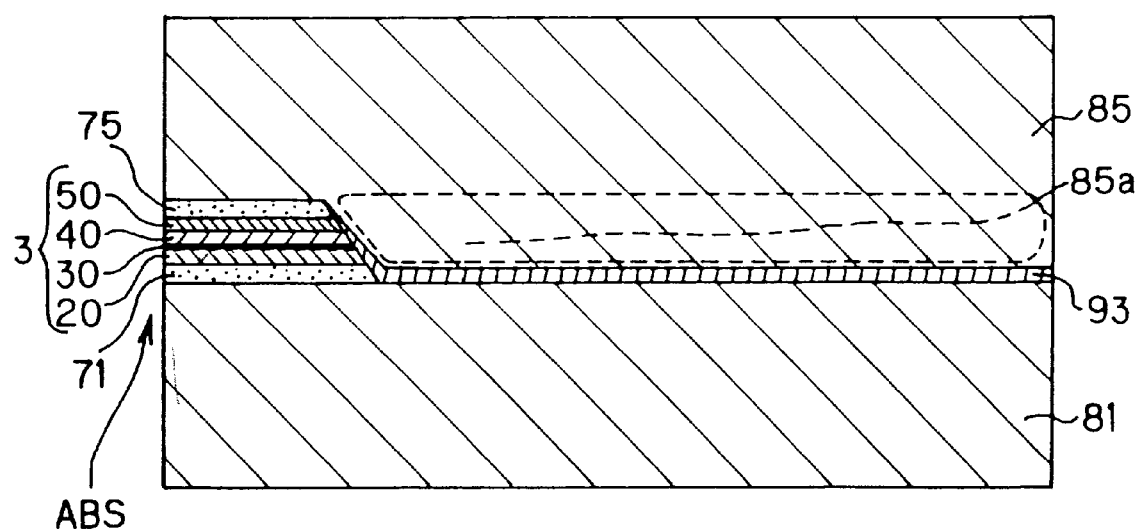
FIG. 4 is a sectional view taken along a center line in a depth direction of a drawing sheet in FIG. 1.

FIG. 4 is a sectional view taken along a center line in a depth direction in FIG. 1. In FIG. 4, the left-side end represents an ABS (Air Bearing Surface) which confronts a so-called magnetic recording medium and is formed with a magnetic sensitive portion of the tunnel multilayered film 3. The common lead and shield layers 81 and 85 extend to a rear end portion of the head (rightward in FIG. 4) and partitioned by the insulating layers 93. The common lead and shield layer 85 has a portion 85a (portion surrounded by dotted line) which extends to a rear portion of the tunnel multilayered film 3 and serves as a back flux guide. Specifically, the common lead and shield layer 85 is designed to extend to the rear portion of the tunnel multilayered film 3 from the ABS (Air Bearing Surface) so as to improve a read output, so that the portion 85a of the common lead and shield layer positioned at the rear portion of the tunnel multilayered film serves as the back flux guide for improving the read output. This structural feature is quite important for the present invention and enables the tunnel multilayered film 3 as a magnetic sensitive portion to effectively pickup a magnetic signal so that the read output can be improved.

Now, a basic method of fabricating the magnetic head shown in FIG. 1 will be briefly explained with reference to FIGS. 2A to 4.

Figure 2A:
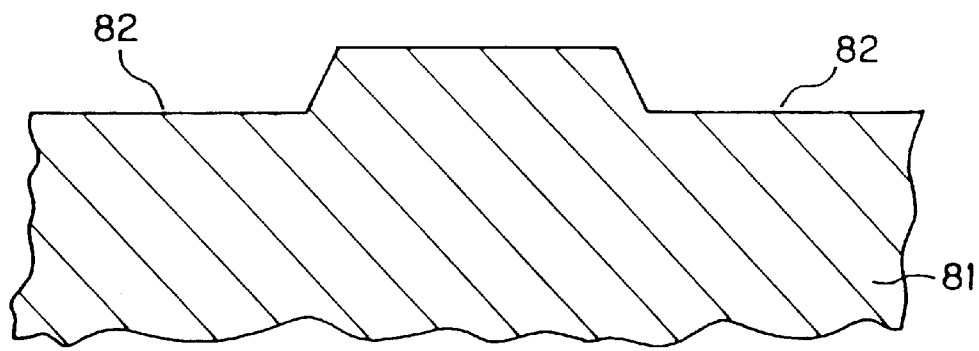
FIGS. 2A and 2B are diagrams for explaining a fabrication method of the magneto-resistive tunnel junction head according to the present invention.
Figure 2B:
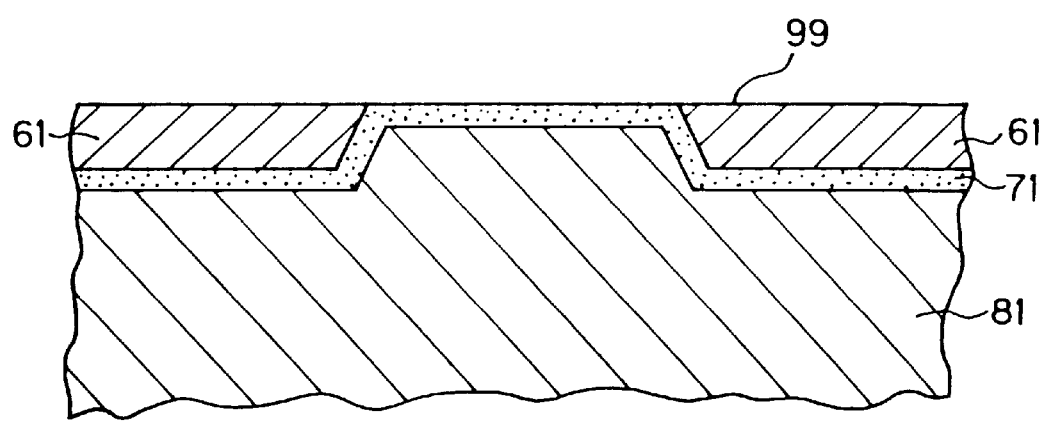

In the first place, as shown in FIG. 2A, a planar common lead and shield layer 81 is ion-milled at its opposite ends through a resist hole to form two rectangular holes 82 and 82, on which a gap layer 71 is formed through sputtering as shown in FIG. 2B. Then, a biasing means 61 made of, for example, a highly coercive material such as CoPt is formed on the gap layer 71. Thereafter, by way of the chemical-mechanical planarization, a clean planar surface 99 having two divided biasing means 61, 61 is formed as shown in FIG. 2B.

Figure 3A:
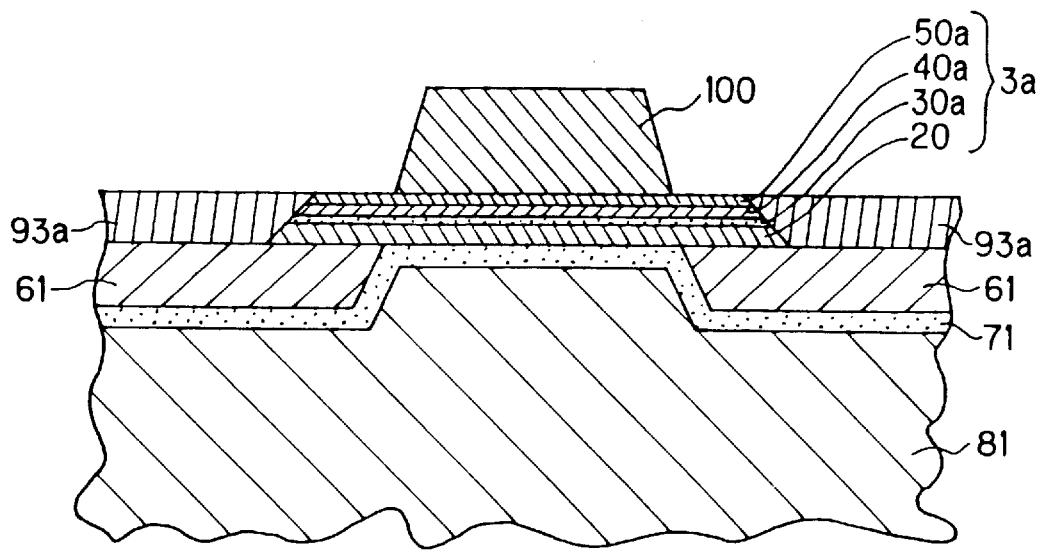
FIGS. 3A and 3B are diagrams for explaining a fabrication method of the magneto-resistive tunnel junction head according to the present invention.

Now, processes up to the state of FIG. 3A will be explained. On the planar surface 99 described above, a TMR multilayered film is formed. Specifically, a Ta seed layer (not shown), a ferromagnetic free layer 20, a tunnel barrier layer 30a, a ferromagnetic pinned layer 40a, a pinning layer 50a and a capping Ta layer (not shown) are deposited in turn on the planar surface. It is desired that the ferromagnetic free layer 20 and the ferromagnetic pinned layer 40a be deposited while a magnetic field is applied thereto. The magnetization direction of the ferromagnetic free layer 20 is set to be in parallel with the ABS in the state of an external magnetic field being zero, while the magnetization direction of the ferromagnetic pinned layer 40a is set to be orthogonal to the magnetization direction of the ferromagnetic free layer 20. After forming the TMR multilayered film, a first resist mask (not shown) is pattern-formed on the tunnel multilayered film 3a to define a length of the multilayered film. An unprotected portion of the tunnel multilayered film 3a is ion-milled to the gap layer 71 and the milled vacant portion is deposited with an insulating layer 93a (of alumina, for example). After a lift-off step, a second resist mask 100 of smaller dimensions is deposited on the tunnel multilayered film 3a, as shown in FIG. 3A.

Figure 3B:
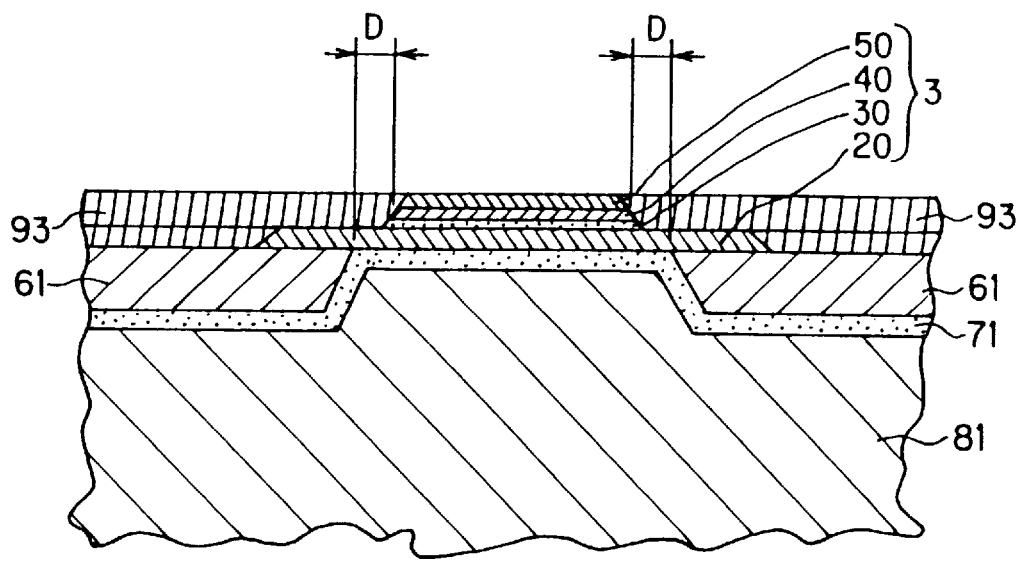

Now, processes up to the state of FIG. 3B will be explained. A portion unprotected by the resist mask 100 is ion-milled and the etching continues until it reaches the ferromagnetic free layer 20. Further, a second insulating layer 93 is deposited until it is stacked to the horizontal level, as shown in FIG. 3B.

Then, a gap layer 75 and a common lead and shield layer 85 are stacked in turn so that a magnetic head configuration as shown in FIGS. 1 and 4 is completed.

A method of forming a back flux guide portion as shown in FIG. 4 will be explained. From the state shown in FIG. 3B, the gap layer 75 is formed on the TMR multilayered film and then a resist mask is patterned to overlay or cover a front portion of the head. An unprotected region is ion-milled extensively to the common lead and shield layer 81 located at a lower position. The insulating layer 93 is formed for preventing an electrical short between the common lead and shield layers 81 and 85, and the common lead and shield layer 85 is formed after the lift-off step to complete the magnetic head configuration. Thus, as shown in FIG. 4, the back flux guide portion is formed at the back of the ferromagnetic free layer 20 which magnetically picks up a signal magnetic field, so that the effective magnetic permeability of the ferromagnetic free layer 20 is improved to increase the flux density in the ferromagnetic free layer 20, with the result that larger magnetization rotation is obtained to thereby improve the output characteristic.

After the head configuration is completed as described above, a pin-anneal step is implemented, in which magnetization of the ferromagnetic pinned layer 40 is pinned by the pinning layer 50 while cooled down in a proper magnetic field. In the final step, the ferromagnetic free layer 20 is subjected to a biasing operation (e.g. pinning operation) implemented by the biasing means 61.

Figure 5:
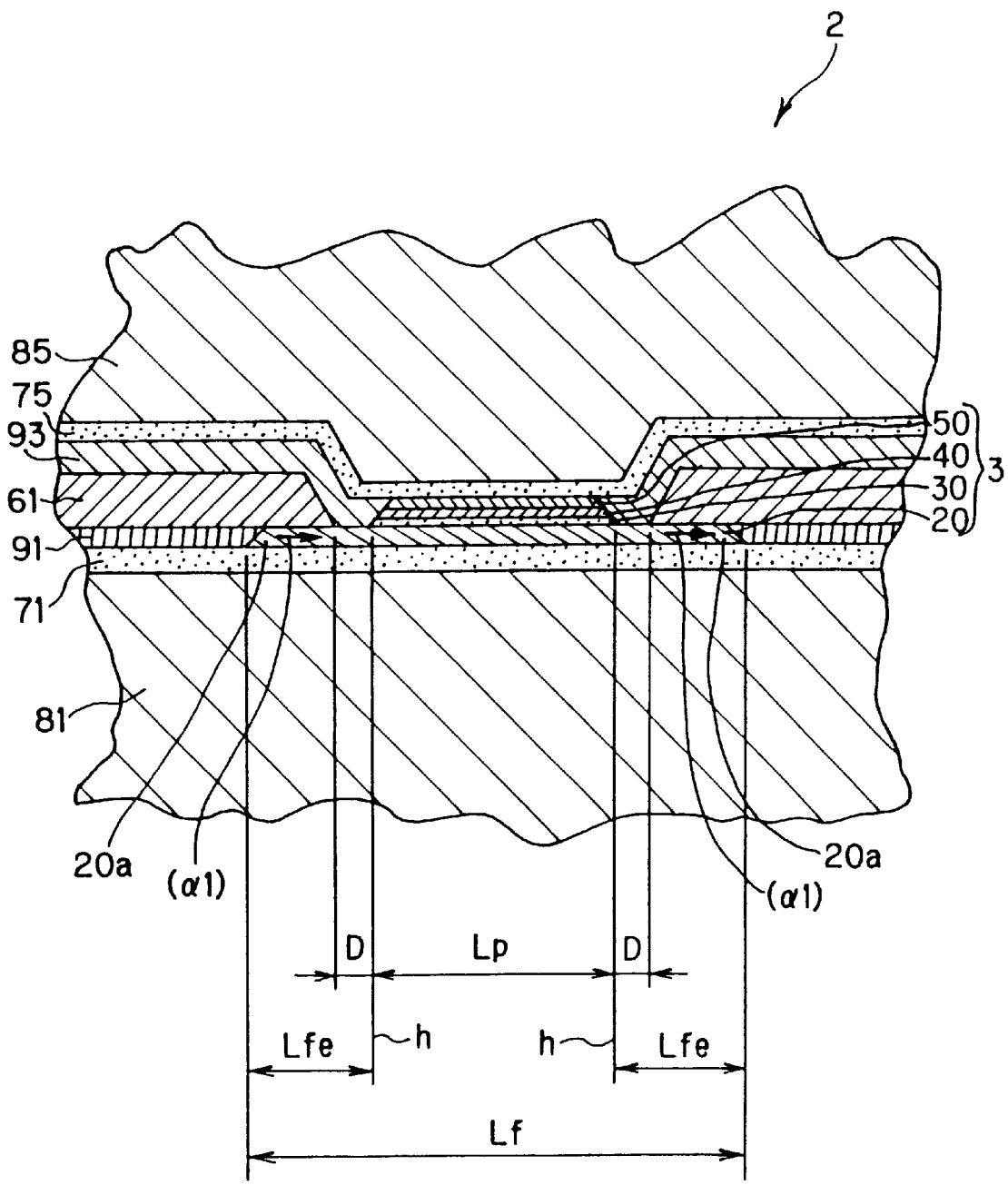
FIG. 5 is a sectional view showing a magneto-resistive tunnel junction head according to another preferred embodiment of the present invention.

FIG. 5 shows a TMR magnetic head 2 as a modification of the TMR magnetic head 1 shown in FIG. 1. The TMR magnetic head 2 basically differs from the TMR magnetic head 1 of FIG. 1 in location of the biasing means 61 and 61. Specifically, the biasing means 61 and 61 in FIG. 5 are disposed on upper portions at the opposite ends of the ferromagnetic free layer 20. Even in the embodiment of FIG. 5, it is also desired that the specifications of the ferromagnetic free layer 20, the ferromagnetic pinned layer 40 and the biasing means 61 and 61 be designed to satisfy the requirements similar to those of the embodiment of FIG. 1 so that a high output can be obtained. In FIG. 5, it should be appreciated that the number and location of the insulating layers are changed in accordance with the modification in location of the biasing means 61 and 61. The entire structure of the TMR head 2 shown in FIG. 5, particularly components thereof not yet explained, will be briefly explained as follows. Specifically, in FIG. 5, insulating layers 91 and 91 made of, for example, alumina are externally formed at the opposite ends of the ferromagnetic free layer 20. In addition, insulating layers 93 and 93 of alumina or the like are further provided on the biasing means 61 and 61 such that each of the insulating layers 93 and 93 extends into the foregoing space D. With this arrangement, the biasing means 61 and 61 are securely insulated from the tunnel barrier layer 30.

Hereinbelow, a method of fabricating the magnetic head 2 shown in FIG. 5 will be briefly explained with reference to FIGS. 6A to 7B.

Figure 6A:
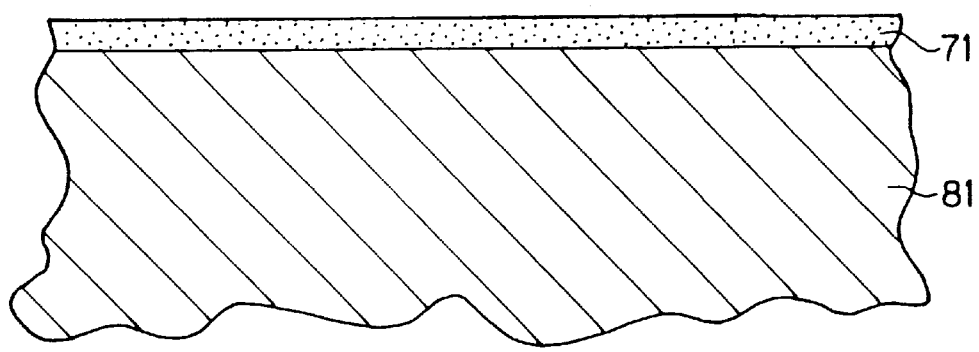
FIGS. 6A and 6B are diagrams for explaining a fabrication method of the magneto-resistive tunnel junction head according to the present invention.

As shown in FIG. 6A, a gap layer 71 is first formed on a planar common lead and shield layer 81 through sputtering. As described above, it is desired that the gap layer 71 be formed of an anticorrosive material, so that any electric and magnetic damages, which are serious to the head characteristics, can be prevented in the lapping step which is implemented to determine the sensor height at the end of the head fabricating process.

Figure 6B:
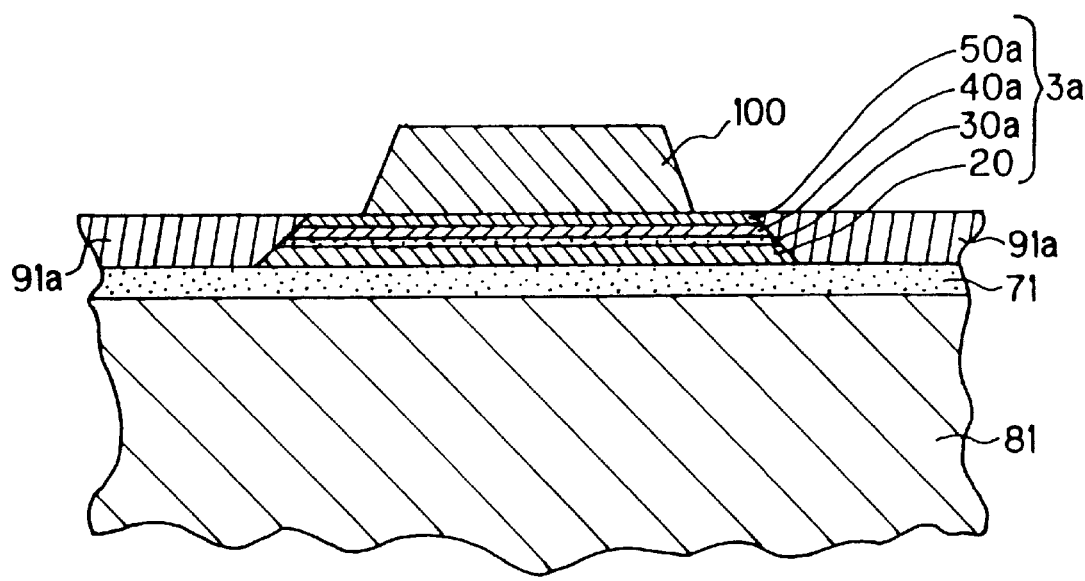

Next, processes up to the state of FIG. 6B will be explained. A Ta seed layer (not shown), a ferromagnetic free layer 20, a tunnel barrier layer 30a, a ferromagnetic pinned layer 40a, a pinning layer 50a and a capping Ta layer (not shown) are deposited in turn on the gap layer 71. It is desired that the ferromagnetic free layer 20 and the ferromagnetic pinned layer 40a be deposited while a magnetic field is applied thereto. The magnetization direction of the ferromagnetic free layer 20 is set to be in parallel with the ABS, while the magnetization direction of the ferromagnetic pinned layer 40a is set to be orthogonal to the magnetization direction of the ferromagnetic free layer 20. A first resist mask (not shown) is formed on the tunnel multilayered film 3a. An unprotected portion of the tunnel multilayered film 3a is ion-milled extensively to the gap layer 71 and the milled vacant portion is deposited with an insulating layer 91a. The tunnel multilayered film 3a after a lift-off step is shown in FIG. 6B, on which a second resist mask pattern 100 is formed.

Figure 7A:
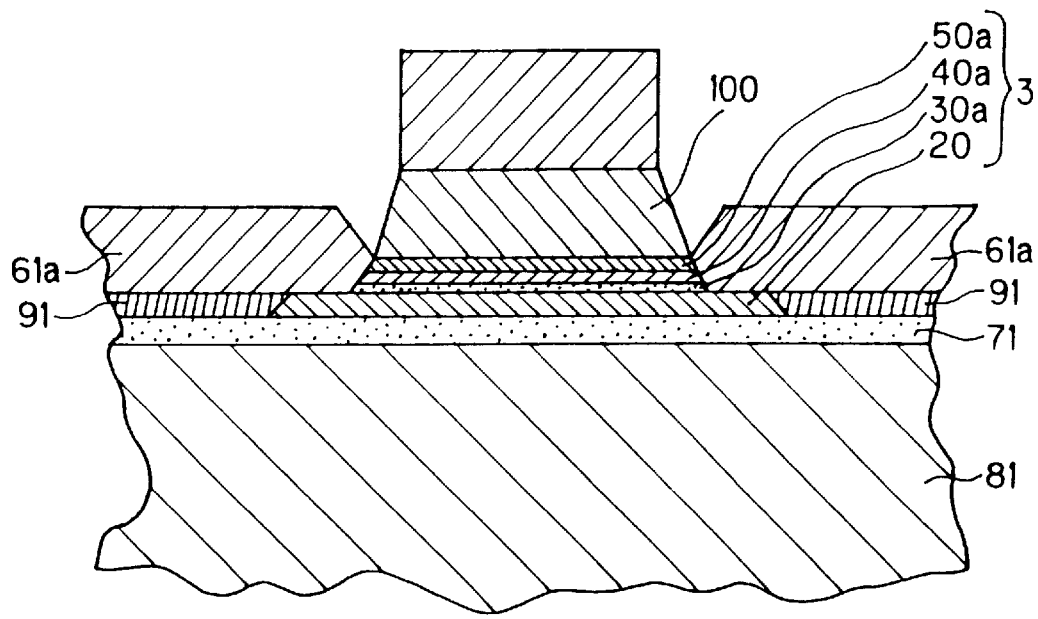
FIGS. 7A and 7B are diagrams for explaining a fabrication method of the magneto-resistive tunnel junction head according to the present invention.

Now, processes up to the state of FIG. 7A will be explained. A portion unprotected by the resist mask pattern 100 is ion-milled and the etching proceeds until it reaches the ferromagnetic free layer 20. At this time point, the insulating layer 91 is formed into a desired configuration. In the next step, a biasing means layer 61a is formed through sputtering to cover the ends of the ferromagnetic free layer 20.

Figure 7B:
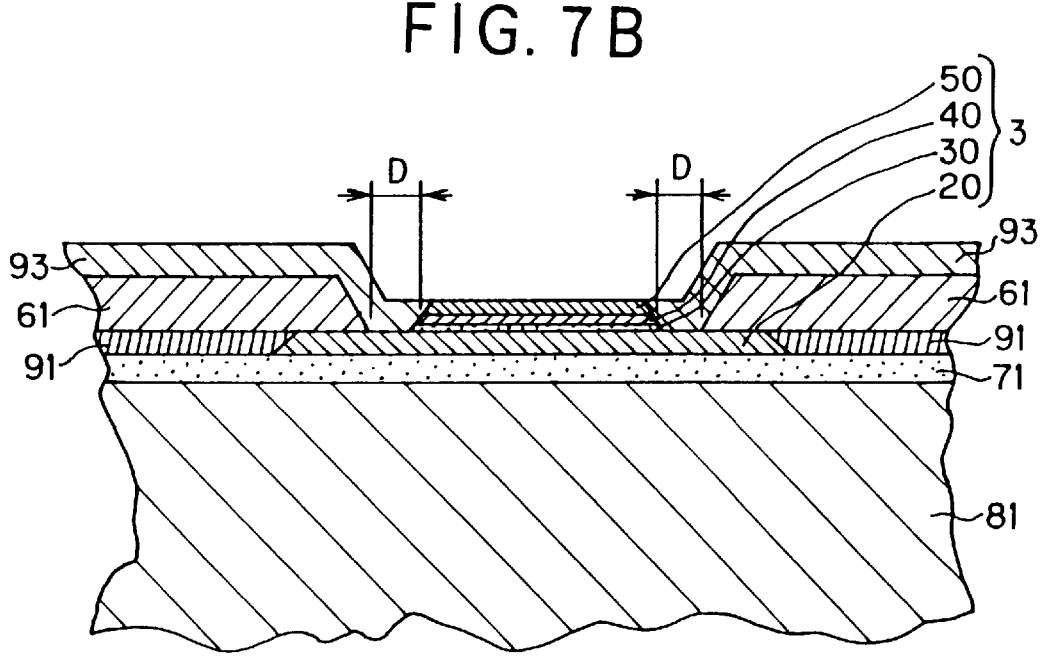

Next, processes up to the state of FIG. 7B will be explained. After the lift-off step, a third resist mask pattern is formed on the tunnel multilayered film 3a.

Ion milling is continued to the ferromagnetic free layer 20 to provide a predetermined space D from the longitudinal end of the ferromagnetic pinned layer 40 to the end of the basing means 61. At this stage, the layer of the basing means 61 is thinned by the ion milling to the predetermined thickness. Then, an insulating layer 93 of alumina or the like is formed through sputtering before the final lift-off step, so as to prevent an electric short circuit between the common lead and shield layers 81 and 85.

In the final step, a gap layer 75 and the common lead and shield layer 85 are continuously formed to provide a complete head structure as shown in FIG. 5. Further, as in the case of FIG. 1, a pin-annealing step is carried out. Specifically, magnetization of the ferromagnetic pinned layer 40 is pinned by the pinning layer 50 while cooled down in a proper magnetic field. Finally, a biasing operation (e.g. pinning operation) is applied to the ferromagnetic free layer 20 by the biasing layer 61.

The magneto-resistive tunnel junction head has been explained with respect to an example in which a pair of common lead and shield layers 81 and 85 are formed on the opposite sides of the tunnel multilayered film 3. However, the technical idea of using the common lead and shield layers for the purpose of shortening a lead gap is also applicable to a so-called composite head which is a combination of a read-only TMR head and a write-only inductive head and, in view of the composite head, only one side may be provided with the common lead and shield layer.

Further, with respect to the structure of the tunnel multilayered film 3, a ferromagnetic thin film layer of a high electron conduction spin polarization material such as CoFe may be interposed between the ferromagnetic free layer 20 and the tunnel barrier layer 30 to enhance the TMR ratio.

The invention of the foregoing magneto-resistive tunnel junction head will be explained in further detail based on the following concrete experimental example:

EXAMPLE I

A sample of a magneto-resistive tunnel junction head having the same structure as the embodiment shown in FIGS. 1 and 4 was prepared. Specifically, a magnetic head sample having a tunnel multilayered film 3 was prepared, which was composed of a ferromagnetic free layer 20 of a two-layered laminate body of NiFe (100 Å in thickness) and Co (20 Å in thickness), a tunnel barrier layer 30 (aluminum oxide; 12 Å in thickness), a ferromagnetic pinned layer 40 (Co; 30 Å in thickness) whose magnetization is pinned in a detection magnetic field direction, and a pinning layer 50 (RuRhMn; 100 Å in thickness) for pinning the magnetization of the ferromagnetic pinned layer 40. Common lead and shield layers 81 and 85 for supplying a current to the tunnel multilayered film 3 was formed of permalloy (3 $\mu$m in thickness), and gap layers 71 and 75 each made of Ta and having a thickness of 400 Å were formed between the tunnel multilayered film 3 and the common lead and shield layer 81 and between the tunnel multilayered film 3 and the common lead and shield layer 85. On the longitudinal opposite ends of the ferromagnetic free layer 20, permanent magnets 61 and 61 of CoPt were provided in an overlapping fashion as biasing means. With the basing means 61 and 61, a bias magnetic field was applied to the ferromagnetic free layer 20 in the longitudinal direction thereof (e.g. in the direction of arrow $\alpha$1). A junction distance of the overlapped portion was set to 0.5 $\mu$m, and a space value D was set to 0.1 $\mu$m. Further, an $L_p$ value in FIG. 1 was set to 0.5 $\mu$m, an $L_f$ value was set to 1.7 $\mu$m, and a track width was set to 0.5 $\mu$m. Configuration of insulating layers 93 and 93 were the same as that shown in FIG. 1 and made of alumina.

Figure 10:
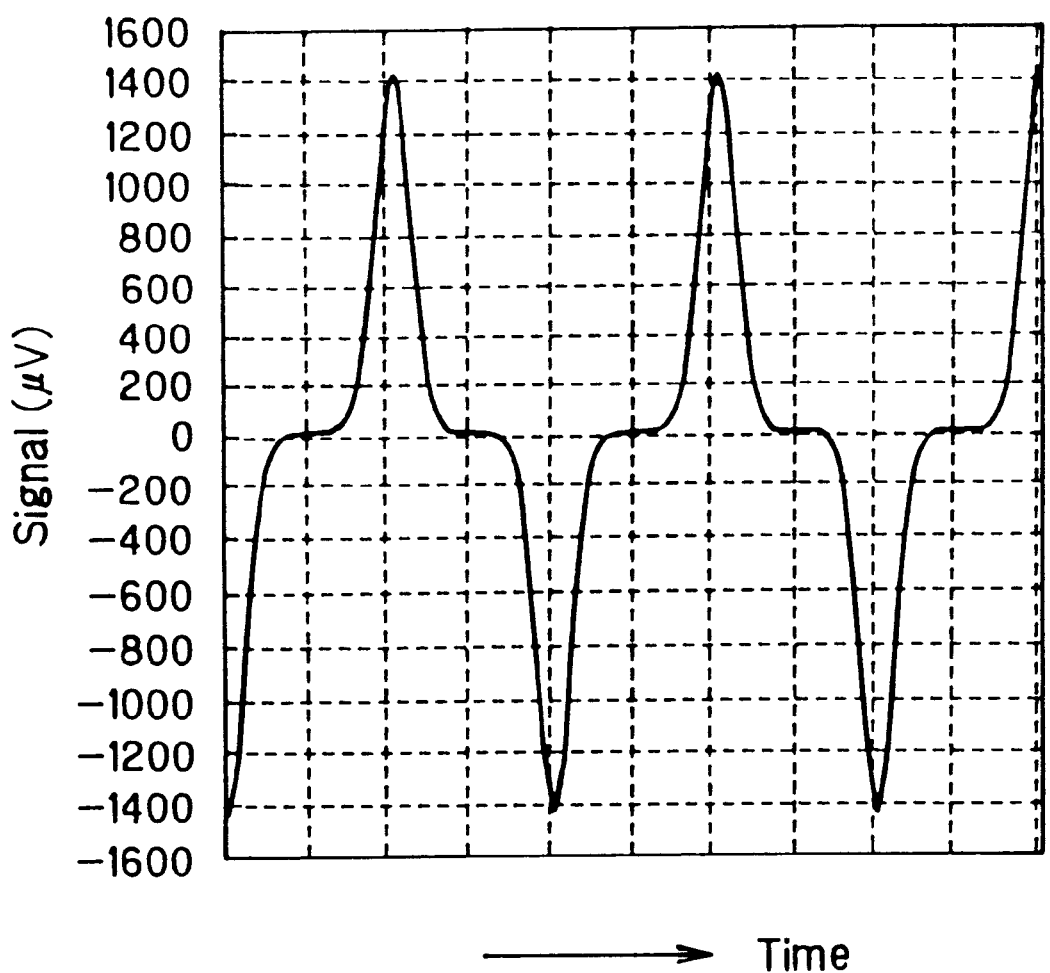
FIG. 10 is a diagram showing an output waveform obtained by using the magnetic head according to the present invention.

The foregoing TMR head sample according to the present invention was prepared and subjected to measurement of an actual head output. The resistance of the head was set to 167$\Omega$, and the sense current was set to 1 mA. It was found that a peak to peak output obtained was 2890 $\mu$V, and an asymmetrical control of the output waveform was excellent. Moreover, the output is stable and quiet due to the improved biasing efficiency. The output waveform actually obtained is shown in FIG. 10.

As described above, in the present invention, the common lead and shield layer is used so as to be electrically contacted with the tunnel multilayered film for supplying a sense current to the tunnel multilayered film. The common lead and shield layer extends to a rear portion of the tunnel multilayered film from the ABS (Air Bearing Surface) so that a part of the common lead and shield layer located at the rear portion of the tunnel multilayered film serves as a back flux guide for improving the read output. Therefore, the read gap can be remarkably reduced to easily achieve the high-density recording. Further, a large and stable head output suitable for the ultra-high density recording can be obtained with an improved biasing efficiency.

What is claimed is:

1. A magneto-resistive tunnel junction head comprising:
    a tunnel multilayered film having a tunnel barrier layer, a ferromagnetic free layer and a ferromagnetic pinned layer such that said tunnel barrier layer is between said ferromagnetic free layer and said ferromagnetic pinned layer; and
    at least two common lead and shield layers electrically contacted across a laminate direction of said tunnel multilayered film to both of opposite sides of said tunnel multilayered film, each of said common lead and shield layers serving both as an electrode for allowing a sense current to flow through said tunnel multilayered film and as a magnetic shield layer,
    wherein at least one of said common lead and shield layers extends from an air bearing surface beyond a rear portion of said tunnel multilayered film so that a part of said at least one of said common lead and shield layers extends in said laminate direction beyond the rear portion of said tunnel multilayered film to define a back flux guide portion for improving a read output, said back flux guide portion extending transverse to said laminate direction.

2. The magneto-resistive tunnel junction head according to claim 1, wherein longitudinal opposite ends of said tunnel multilayered film are insulated by insulating layers.

3. The magneto-resistive tunnel junction head according to claim 1, furher comprising:
    an electrically conductive, non-magnetic gap layer provided between a respective one of said at least two common lead and shield layers and said tunnel multilayered film.

4. The magneto-resistive tunnel junction head according to claim 1, wherein said at least two common lead and shield layers are made of a material selected from NiFe, Sendust, CoFe and CoFeNi.

5. The magneto-resistive tunnel junction head according to claim 3, wherein said gap layer comprises a layer made of a material selected from Cu, Al, Ta, Au, Cr, In, Ir, Mg, Rh, Ru, W, Zn or an alloy thereof.

6. The magneto-resistive tunnel junction head according to claim 5, wherein said gap layer has a thickness of 50 to 700 Å.

7. The magneto-resistive tunnel junction head according to claim 3, wherein said gap layer is made of a highly anticorrosive material and selected from of at least one of Ta, Rh and Cr.

8. The magneto-resistive tunnel junction head according to claim 1, further comprising:
    a biasing mechanism connecting to longitudinally opposite ends of said ferromagnetic free layer so that a biasing magnetic field is applied to said ferromagnetic free layer in a longitudinal direction thereof,
    wherein said ferromagnetic free layer has a length in said longitudinal direction which is set greater than a longitudinal length of said ferromagnetic pinned layer such that said ferromagnetic free layer has at opposite ends thereof extended portions, each extended portion extending beyond a corresponding one of longitudinal opposite ends of said ferromagnetic pinned layer.

9. The magneto-resistive tunnel junction head according to claim 8, wherein said biasing mechanism magnetically contacts upper or lower portions of said extended portions of said ferromagnetic free layer, and is located with a predetermined space from a corresponding one of the longitudinal opposite ends of said ferromagnetic pinned layer.

10. The magneto-resistive tunnel junction head according to claim 9, wherein said space is set to no less than 0.02 µm.

11. The magneto-resistive tunnel junction head according to claim 9, wherein said space is set to no less than 0.02 µm and no greater than 0.3 µm.

12. The magneto-resistive tunnel junction head according to claim 9, wherein said space is set to no less than 0.02 µm and less than 0.15 µm.

13. The magneto-resistive tunnel junction head according to claim 1, wherein said ferromagnetic free layer has a thickness of 20 to 500 Å.

14. The magneto-resistive tunnel junction head according to claim 1, wherein said tunnel multilayered film has a multilayered film detection end surface constituting the air bearing surface.

15. The magneto-resistive tunnel junction head according to claim 1, wherein said ferromagnetic free layer is a synthetic ferrimagnet.

16. The magneto-resistive tunnel junction head according to claim 1, wherein said ferromagnetic pinned layer comprises:

a pair of ferromagnetic films; and a non-magnetic film integral between said pair, wherein the pair of ferromagnetic films is antiferromagnetically coupled via the non-magnetic film.

17. The magneto-resistive tunnel junction head according to claim 8, wherein each said biasing mechanism is made of at least one of a highly coercive material, an anti ferromagnetic material, and a laminate body having an antiferromagnetic layer and at least one ferromagnetic layer.

18. The magneto-resistive tunnel junction head according to claim 1, further comprising:

a pinning layer configured to pin a magnetization of said ferromagnetic pinned layer and stacked on a surface of said ferromagnetic pinned layer remote from a side thereof abutting said tunnel barrier layer.

* * * * *